(12) United States Patent
Shaw et al.

(10) Patent No.: US 6,997,103 B2
(45) Date of Patent: Feb. 14, 2006

(54) BEVERAGE BREWING METHOD AND APPARATUS

(75) Inventors: Jon W. Shaw, Oakley (GB); John C. Cooke, Farnborough (GB)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 10/495,995

(22) PCT Filed: Dec. 10, 2002

(86) PCT No.: PCT/GB02/05575

§ 371 (c)(1),
(2), (4) Date: Sep. 15, 2004

(87) PCT Pub. No.: WO03/053200

PCT Pub. Date: Jul. 3, 2003

(65) Prior Publication Data

US 2005/0031747 A1 Feb. 10, 2005

(30) Foreign Application Priority Data

Dec. 11, 2001 (GB) .................................. 0129656

(51) Int. Cl.
*A47J 31/40* (2006.01)
(52) U.S. Cl. ..................... 99/295; 99/302 R
(58) Field of Classification Search .............. 99/295, 99/302 R, 284, 287; 426/433, 112, 115, 426/77, 79
See application file for complete search history.

(56) References Cited

U.S. PATENT DOCUMENTS

| | | | | |
|---|---|---|---|---|
| 6,644,173 B1 * | 11/2003 | Lazaris et al. | ................. | 99/295 |
| 6,708,600 B1 * | 3/2004 | Winkler et al. | ................ | 99/295 |
| 6,740,345 B1 * | 5/2004 | Cai | ............................. | 426/77 |

* cited by examiner

*Primary Examiner*—Reginald L. Alexander
(74) *Attorney, Agent, or Firm*—Fulbright & Jaworski LLP; Jan K. Simpson

(57) ABSTRACT

A method for brewing beverages in a machine, which comprises: (a) providing a machine comprising a clamp which is adapted to hold a beverage brewing sachet and a liquid injector tube for injecting liquid into a sachet held in the clamp, wherein the injector tube has a tip and an outlet hole in said tip; (b) providing a beverage brewing sachet containing a beverage brewing ingredient and having at least one side wall region formed of flexible film; (c) inserting the sachet into the clamp; (d) piercing the flexible film in the side wall region of the sachet with the liquid injector tube; and (e) injecting liquid into the sachet through the injector tube to brew the beverage in the sachet, wherein, following step (d), a flap of the flexible film material extends inwardly from said side wall and over the outlet hole of the injector to form a valve that allows liquid to flow into the sachet from the injector tube, but that blocks or restricts the flow of liquid or solid materials into the injector tube from inside the sachet. Also provided is a beverage brewing apparatus for brewing beverages in accordance with the invention.

7 Claims, 1 Drawing Sheet

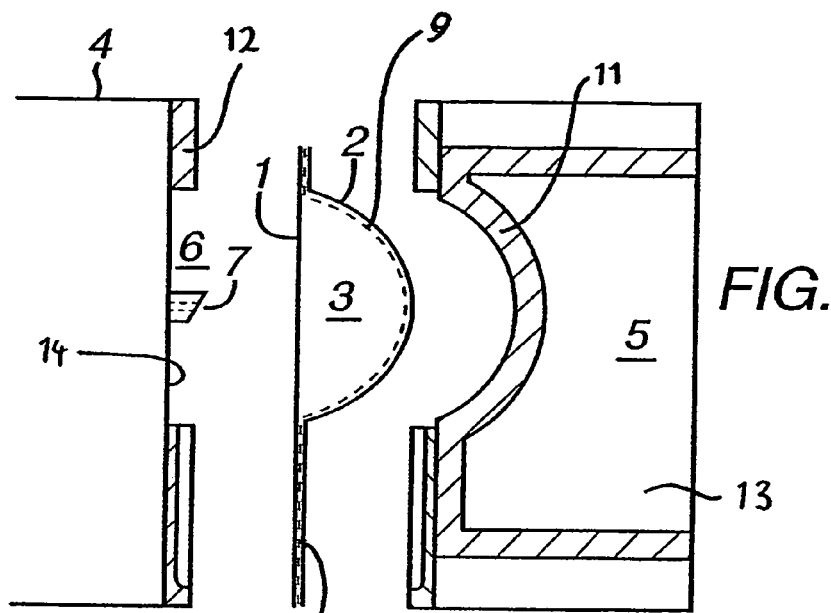
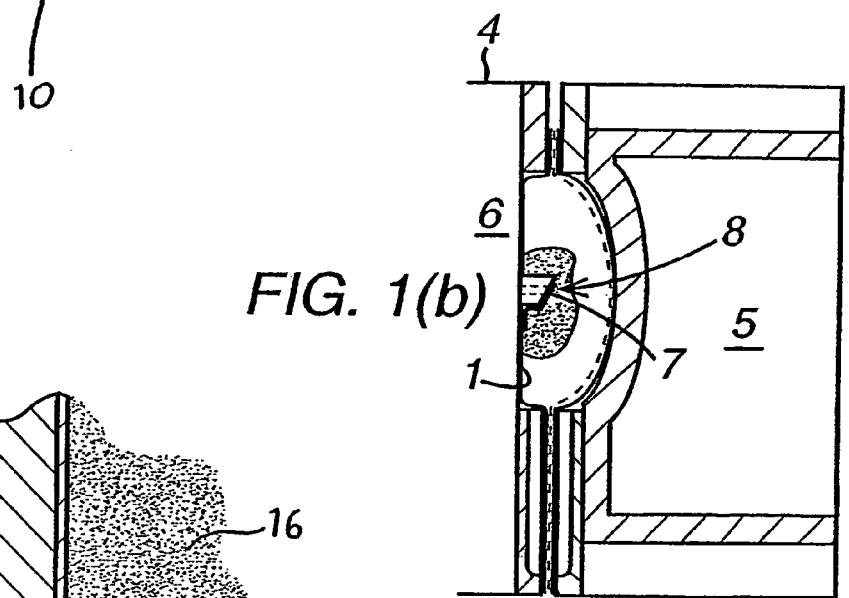
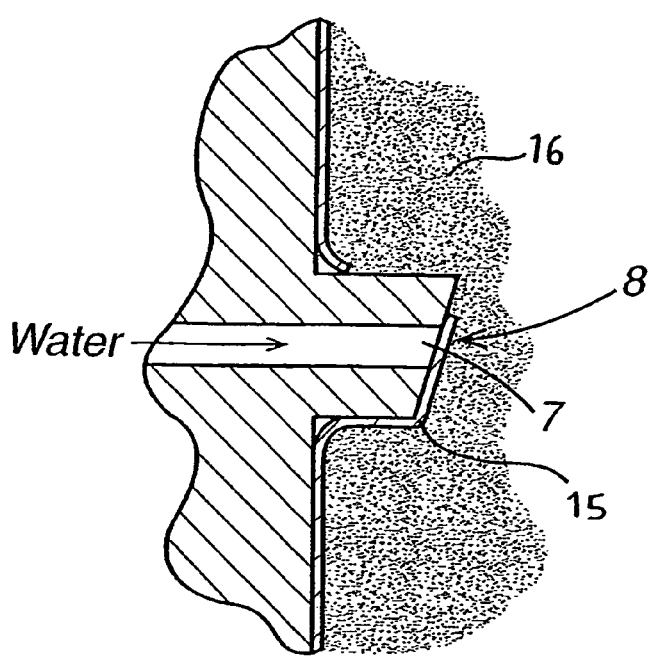
FIG. 1(a)
FIG. 1(b)
FIG. 2

BEVERAGE BREWING METHOD AND APPARATUS

CROSS-REFERENCE TO RELATED APPLICATIONS

This Application is a National Stage of PCT/GB02/05575 filed on Dec. 10, 2002 claiming priority to GB 0129656.5 filed Dec. 11, 2001.

TECHNICAL FIELD

The present invention relates to methods and apparatus for use in beverage brewing by liquid injection into a beverage brewing sachet.

BACKGROUND OF THE INVENTION

It is known to brew individual portions of beverages such as coffee and tea from prepackaged individual sachets or capsules containing a single portion of the beverage brewing ingredient such as ground coffee or leaf tea.

The term "sachet" as used in this specification refers to any portion pack containing a predetermined quantity of a beverage brewing ingredient. A beverage brewing ingredient may be any form of coffee, tea, hot chocolate or soup or any other type of drink to which liquid can be added.

GB-A-2121762, EP-A-0179641 and WO99/05036 describe a beverage brewing system according to which individual portions of beverage brewing ingredients are enclosed in flexible film sachets having an inlet nozzle at the top and a seal at the bottom. In use, hot water is injected through the nozzle into the sachet. The beverage is brewed inside the sachet, and the seal at the bottom of the sachet is opened either before or during the brewing to allow the beverage to flow out through the bottom of the seal. This apparatus provides very good quality, freshly brewed filter coffee, chocolate or leaf tea in individual portions.

PCT/GB01/03978 describes apparatus for the injection of aqueous fluid into a sachet in which the injector tube or tubes pierce a side wall of the sachet to inject the aqueous fluid directly into the interior of the sachet. The injector tube or tubes may project into the brewing cavity at an oblique angle to the exit direction of the beverage cavity, more preferably substantially perpendicularly to exit direction of the beverage cavity. PCT/GB01/03978 teaches that the use of sachets without nozzles is preferable to the use of sachets with nozzles because of the greater ease of manufacturing of sachets without nozzles.

One problem associated with brewing beverages using sachets without inlet nozzles is that as the injector penetrates the sachet, the injector comes into contact with the contents of the sachet, which may be, for example, ground coffee or tea leaves, and the outlet hole of the injector may become blocked as a result. Furthermore, cross-contamination can occur upon subsequent penetration of a sachet containing a different type of beverage by the injector.

BRIEF SUMMARY OF THE INVENTION

The present invention provides a method for brewing beverages in a machine, which comprises:

(a) providing a machine comprising a clamp which is adapted to hold a beverage brewing sachet and a liquid injector tube for injecting liquid into a sachet held in the clamp, wherein the injector tube has a tip and an outlet hole in said tip;

(b) providing a beverage brewing sachet containing a beverage brewing ingredient and having at least one side wall region formed of flexible film (c) inserting the sachet into the clamp (d) piercing the flexible film in the side wall region of the sachet with the liquid injector tube; and (e) injecting liquid into the sachet through the injector tube to brew the beverage in the sachet, wherein, following step (d), a flap of the flexible film material extends inwardly from said side wall and over the outlet hole of the injector to form a valve that allows liquid to flow into the sachet from the injector tube, but that blocks or restricts the flow of liquid or solid materials into the injector tube from inside the sachet.

When aqueous fluid is ejected from the injector outlet hole, the hydraulic pressure forces the flap to be displaced from the outlet hole and allows the fluid to enter the sachet. During this injection process, the flow of aqueous fluid forces the contents of the sachet away from the outlet hole. Consequently, the contents are not able to come into contact with the injector outlet hole and block it. When hydraulic pressure is reduced or absent due to the reduction or stoppage of aqueous fluid being ejected from the injector outlet hole, the nozzle flap can resume its closed position, covering the injector outlet hole.

Preferably, the liquid that is injected through said injector consists essentially of water, optionally mixed with steam. In certain embodiments the water is injected at a pressure of about 0.5 to about 2 bar gauge. In other embodiments, such as in the brewing of espresso coffee, the water is injected at a pressure of about 5 to about 20 bar gauge, preferably about 10 to about 15 bar gauge. The temperature of the water is preferably about 85 to about 100 degrees C.

In certain embodiments the injector tube is movable when the clamp is closed, whereby the step of piercing comprises moving the injector tube inwardly into the clamp cavity while the sachet is held in the clamp.

In other embodiments the injector tube projects a fixed distance into the clamp cavity from a side wall of the clamp, and the step of piercing comprises pressing the said flexible film region of the sachet against the said side wall of the clamp. The pressing may be achieved by the step of closing the clamp on the sachet, or it may be achieved after the clamp has closed by moving a side wall of the clamp to compress the sachet, for example as described in PCT/GB01/03978. In yet other embodiments, the step of pressing may be achieved by pressurizing the contents of the sachet, for example by injecting a fluid into the sachet through another inlet.

The side wall of the clamp preferably comprises a recess around the injector tube, such that the flexible film of the sachet is stretched in the region of the injector tube by the step of pressing. This stretching of the sachet wall ensures a more reliable and predictable piercing of the sachet.

The present invention further provides a beverage brewing apparatus comprising: a clamp comprising at least one side wall defining a beverage brewing cavity for receiving a beverage brewing sachet; and an injector tube extending through the said side wall and having a tip with an outlet hole through which liquid can be injected into the beverage brewing cavity, the injector tube being adapted to pierce a flexible film wall of a beverage brewing sachet that is pressed against the side wall, wherein the injector tube and side wall are dimensioned such that said piercing takes place without the tip of the injector tube penetrating completely into the sachet, whereby a flap of the flexible film wall forms a valve over the tip of the injector tube that allows liquid to flow into the sachet from the injector tube, but that blocks or restricts the flow of liquid or solid materials into the injector tube from inside the sachet.

Typically, the injector tube has a profiled tip. That is to say, the tip is preferably not flat and parallel to the underlying side wall of the clamp, but angled or pointed, for example in similar fashion to a hypodermic needle. Preferably, the injector tube comprises at least one sharp edge for piercing the sachet. In certain embodiments the injector tube has a substantially planar top surface extending from a sharp edge of the tip to a trailing edge of the tip, similar to a hypodermic needle. Preferably, the angle between the perpendicular to this plane and the axis of the injection tube is from about 10 to about 60 degrees, preferably from about 15 to about 45 degrees and most preferably about 30 degrees.

Preferably, the injector tube is substantially cylindrical. Preferably, the mean height of the tip of the injector tube above the side wall is from about 0.1 to about 5 times the mean outside diameter of the injector tube, more preferably from about 0.5 to about 3 times the mean outside diameter. Longer injection tubes will tend to penetrate right through the flexible film material of the sachet and not form the desired valve flap.

Typically the mean outside diameter of the injector tube is from about 3 to 8 mm, and is preferably about 5 mm. Accordingly, the mean height of the injector tube is typically from about 1 to 6 mm, preferably about 4 mm. The mean outside diameter:mean height ratio for the injector tube is from about 8:1 to 1:2, preferably about 5:4. Typically, the mean inside diameter of the injector tube is from about 0.5 to 3 mm, preferably about 1 mm. The apparatus may comprise a plurality of said injector tubes preferably having these characteristics.

The injector of the present invention would preferably be made out of a rigid material that can be readily shaped so that it can penetrate the material from which the sachet or other compartment is made. The preferred material from which the injector of the present invention should be made is a metal.

The injector projects from a side wall of the clamp. The side wall is preferably smooth and preferably substantially planar in the vicinity of the injector tube. In certain embodiments the side wall of the clamp comprises a recess around the injector tube, whereby the flexible film of the sachet is stretched in the region of the injector tube by the step of pressing into the recess. This recess is typically from about 1 to about 5 mm deep, preferably about 3 mm, and extends with a mean radius of about 5 to about 25 mm around the injector.

The other elements of the apparatus according to the present invention may, for example, be as described in copending application PCT/GB01/03978, the entire contents of which are incorporated herein by reference. Alternatively, they may be similar to one of the known systems for brewing espresso coffee from capsules, such as those described in WO93/17932 or WO94/02059, the entire contents of which are incorporated herein by reference.

The beverage brewing ingredient in sachets may comprise or consist of an ingredient that disperses completely in hot water, such as instant coffee, or chocolate, or a concentrated milk, cream, creamer, milk powder or milk substitute. The beverage brewing ingredient in sachets may also comprise or consist of materials that do not completely disperse in the water used to brew the beverage, for example, ground coffee or tea. The beverage brewing ingredient may also be in the form of one or more compressed pieces, such as a compressed tablet of ground coffee. Preferably, the sachet is adapted to brew a single cup of beverage.

The present invention further provides a system comprising a beverage brewing apparatus according to the invention and a beverage brewing sachet comprising at least one side wall region formed from a flexible film. The system is suitable for brewing beverages in accordance with the invention. The sachet may, for example be a sachet as described in GB-A-2121762, EP-A-0179641 or WO99/05036, the entire contents of which are incorporated herein by reference.

The apparatus or systems according to the present invention are preferably adapted for carrying out the methods according to the present invention. The methods of the present invention are preferably performed using an apparatus or system according to the invention as hereinbefore defined.

BRIEF DESCRIPTION OF THE DRAWINGS

A specific embodiment of the present invention will now be described further, by way of example, with reference to the accompanying drawings, in which:

FIGS. 1(a) and 1(b) show partial schematic cross sectional views of steps in the brewing of a beverage using brewing apparatus containing an injector in accordance with the present invention; and FIG. 2 shows a detailed schematic cross sectional view of part of FIG. 1(b).

DETAILED DESCRIPTION OF THE INVENTION

Referring to FIG. 1(a), the sachet comprises a body 2 of a thermoplastic sheet material such as a laminate of polypropylene:nylon, EVOH:nylon, or polypropylene:Aluminium:polyethylene, that has been thermoformed to provide a recess for the beverage brewing ingredient, in this case ground coffee. The sachet is sealed by a back sheet 1 of flexible, metallized plastic film. A filter paper 9 is bonded into the body of the sachet, and a tail extension 10 of the sachet extends out of the bottom of the clamp to provide an outlet for the beverage brewed in the sachet.

The sachet is received in a clamp comprising two clamp members 4,5 that can be moved together to enclose the sachet. A first clamp member 5 comprises an elastomeric membrane 11 supported on a hydraulic reservoir 13 as described in PCT/GB01/03978. A second clamp member 4 comprises a rigid side wall 14 with a metal injector tube 7 projecting inwardly therefrom.

The injector tube 7 has a mean height of about 1 mm above the side wall 14, and a circular cross-section with a diameter of about 1 mm. The tip of the injector tube is obliquely angled in similar fashion to a hypodermic needle, with the top plane at an angle of about 30 degrees to the side wall 14, as shown in FIG. 2.

The clamp member includes a rigid spacing element 12 defining a recess around the injection tube 7.

Referring to FIG. 1(b), upon closure of the clamp 4,5, the hydraulic reservoir 13 is pressurized to press the flexible film face 1 of the sachet against the second clamp member 4. The pressure causes the flexible sheet to bulge into the recess in the clamp member, thereby presenting a tensioned sheet for piercing by the injector tube 7.

When the injector has penetrated the flexible film 1 of the sachet to its maximum extent, the injector outlet hole 7 is still covered by a flap 8 of the sachet film material, as shown in FIG. 2. Thus, the injector outlet hole is not in contact with the sachet contents 16 but is separated therefrom by the flap 8.

The flap is hinged at the edge 15 of the injector tube 7, and is sufficiently flexible that upon injection of liquid through the injector outlet hole, the flap 8 is displaced to allow liquid to enter the sachet. When the supply of liquid to the injector tube stops, the back pressure in the sachet presses the flap 8 against the top of the injector tube 7, thereby preventing any of the contents of the sachet from entering the injection tube The above embodiment of the present invention has been described by way of example only. Many other embodiments falling within the scope of the accompanying claims will be apparent to the skilled reader.

What is claimed is:

1. A beverage brewing apparatus comprising:
    a clamp comprising at least one side wall defining a beverage brewing cavity for receiving a beverage brewing sachet;
    an injector tube extending through the said side wall and having a tip with an outlet hole through which liquid can be injected into the beverage brewing cavity, the injector tube being adapted to pierce a flexible film wall of a beverage brewing sachet that is pressed against the side wall,
    wherein the injector tube and side wall are dimensioned such that said piercing takes place without the tip of the injector tube penetrating completely into the sachet, whereby a flap of the flexible film wall forms a valve over the tip of the injector tube that allows liquid to flow into the sachet from the injector tube, but that blocks or restricts the flow of liquid or solid materials into the injector tube from inside the sachet.

2. A beverage brewing apparatus according to claim 1, wherein the injector tube has a profiled tip.

3. A beverage brewing apparatus according to claim 1, wherein the mean height of the injector tube above the side wall is from 0.1 to 5 times the mean outside diameter of the injector tube.

4. A beverage brewing apparatus according to claim 1, wherein the mean outside diameter of the injector tube is from 3 to 8 mm.

5. A beverage brewing apparatus according to claim 1, wherein the mean height of the injector tube is from 1 to 6 mm.

6. A beverage brewing apparatus according to claim 1, wherein the mean outside diameter:mean height ratio of the injector tube is from about 8:1 to about 1:2.

7. A beverage brewing apparatus according to claim 1, wherein the said side wall of the clamp comprises a recess around the injector tube, whereby the flexible film of the sachet is stretched in the region of the injector tube by the step of pressing.

* * * * *